(12) United States Patent
Okuno et al.

(10) Patent No.: US 7,588,861 B2
(45) Date of Patent: Sep. 15, 2009

(54) BATTERY ELECTRODE PRODUCING METHOD OF FILLING ACTIVE MATERIAL INTO A METAL COATED FABRIC SUBSTRATE

(75) Inventors: Kazuki Okuno, Hyogo (JP); Keizo Harada, Hyogo (JP); Masahiro Kato, Hyogo (JP); Tetsuo Sakai, Osaka (JP); Tsutomu Iwaki, Osaka (JP); Masaru Yao, Osaka (JP)

(73) Assignees: Sumitomo Electric Industries, Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 112 days.

(21) Appl. No.: 11/712,473

(22) Filed: Mar. 1, 2007

(65) Prior Publication Data
US 2007/0207388 A1    Sep. 6, 2007

(30) Foreign Application Priority Data
Mar. 2, 2006    (JP)    ............................. 2006-056977

(51) Int. Cl.
*H01M 4/04*    (2006.01)
(52) U.S. Cl. ...................................... 429/234; 429/128
(58) Field of Classification Search ................. 429/128, 429/234
See application file for complete search history.

(56) References Cited

U.S. PATENT DOCUMENTS 5,393,616 A  *  2/1995  Mori et al. .................... 429/59
5,506,070 A  *  4/1996  Mori et al. .................... 429/59
6,465,133 B1 * 10/2002  Kariya et al. ................ 429/235
6,656,232 B1 * 12/2003  Usui et al. ................. 29/623.1
6,759,034 B2 *  7/2004  Ovshinsky et al. ............ 424/69
2002/0182483 A1 * 12/2002 Miyahisa et al. .............. 429/94

FOREIGN PATENT DOCUMENTS

| JP | 55-30180 A | | 3/1980 |
| JP | 61-208756 A | | 9/1986 |
| JP | 2000-077067 | * | 3/2000 |

* cited by examiner

*Primary Examiner*—Mark Ruthkosky
(74) *Attorney, Agent, or Firm*—McDermott Will & Emery LLP

(57) ABSTRACT

A method of producing an electrode includes the steps of filling an active material in an electrode substrate made of woven or non-woven fabric having its fiber surface coated with metal, and pressing the electrode substrate to obtain an electrode, wherein the pressing is performed using the electrode substrate having a thickness of less than 2.0 t when the thickness of the electrode after the pressing is t. This ensues that the electrode substrate has a thickness allowing the active material of a sufficient amount to be filled therein, and a battery electrode in which the filled active material is unlikely to peel off from the electrode substrate can be produced. Accordingly, a battery electrode having a desired thickness and desired capacity and that can suppress degradation in battery performance due to repeated charge and discharge, and its producing method are provided.

1 Claim, No Drawings

BATTERY ELECTRODE PRODUCING METHOD OF FILLING ACTIVE MATERIAL INTO A METAL COATED FABRIC SUBSTRATE

BACKGROUND OF THE INVENTION

1. Field of the Invention

The present invention relates to a battery electrode for use in a secondary battery and a producing method thereof Particularly, the present invention relates to an electrode for a nickel-hydrogen battery and a producing method thereof.

2. Description of the Background Art

A secondary battery that can be charged for reuse is used as a power source for an electronic apparatus, particularly for a portable apparatus. Typical examples of such secondary batteries include alkaline secondary batteries such as nickel-cadmium battery, nickel-hydrogen battery and the like. Among the alkaline secondary batteries, particularly, a high-capacity nickel-hydrogen battery has attracted attention.

The nickel-hydrogen battery is used in a wide range of applications, as it is highly reliable and has a long life, and is less expensive and can be reduced in size than a lithium-ion battery. In particular, hybrid vehicles have recently come into practical use by vehicle manufacturers from the standpoints of energy saving and environmental protection, and have widely attracted attention in foreign countries as well. Currently, the nickel-hydrogen battery is predominantly used as the power source for the hybrid vehicle.

An alkaline battery, often used as a power source for various kinds of devices ranging from portable apparatuses to industrial large-scale facilities, uses a nickel electrode as a positive electrode in most cases. Such a nickel electrode has a structure wherein a collector having an electricity-collecting function carries an active material (positive electrode active material) for causing cell reaction. For the collector, a pocket-type collector was conventionally employed. With development of a sintered nickel plate (nickel sintered body) obtained by sintering nickel powder, however, the nickel sintered body came to be used as the collector, which promoted the practical use of the alkaline secondary batteries.

Subsequently, it was tried to lower the cost and increase the capacity of the nickel electrode. As a way of lowering the cost, it was proposed to use a collector of a two-dimensional structure, such as punching metal, instead of the nickel sintered body having a three-dimensional structure. Specifically, a nickel electrode is fabricated by filling a pasty active material in pores of the punching metal, although this technique has not come into practical use yet.

The increase of the capacity of the nickel electrode has become possible by using, instead of the nickel sintered body, foamed nickel also having a three-dimensional structure as the collector. Generally, the foamed nickel is produced in the following manner. A sheet-shaped foamed article of urethane resin is coated with nickel plating, and is annealed in a reducing atmosphere after incineration of the urethane resin. This can increase the strength of the nickel framework. The foamed nickel is then filled with an active material paste and pressed to obtain a nickel electrode. The foamed nickel has a very large porosity of 92% to 96%, while the above-described nickel sintered body has a porosity of about 80%. This means that, compared to the nickel sintered body, the foamed nickel can increase the amount of the active material that can be filled in per unit volume, which leads to an increase of the capacity.

At the initial stage of development, the foamed nickel was susceptible to damages. For example, at the time of winding a sheet-shaped nickel electrode and housing it in a cylindrical battery case, the foamed nickel would likely suffer cracking. At present, however, this problem has been solved, and the cylindrical as well as prismatic nickel-hydrogen batteries using the foamed nickel as the collector have come into practical use, not only for portable apparatuses, but also for the hybrid vehicles requiring high power output and high reliability. As described above, although the nickel sintered body is still used as the collector of the nickel electrode for the nickel-hydrogen battery in some apparatuses, the nickel electrode having the foamed nickel as the collector that is filled with an active material has become dominant.

Currently, the foamed nickel has reached a level having characteristics suitable for high power application as well as for high capacity application as the collector. The remaining problems are that the manufacturing process is a little complicated, and that it is desirable to reduce the amount of nickel being plated, if possible. In other words, there is a demand for reduction of cost by simplification of the process and reduction in amount of the base material.

Under these circumstances, in recent years, there is proposed an electrode that is produced by employing a porous electrode substrate (collector) formed by plating woven or non-woven fabric with metal (typically, nickel), and by filling an active material in the pores formed in the porous electrode substrate. Here, the active material thus filled is settled in the pores of the produced electrode to work as the active material. The porous electrode substrate is advantageous in that the manufacturing process is easier and the amount of the metal being used can further be reduced, compared to the foamed nickel.

As such an electrode formed by filling an active material in a porous electrode substrate, for example, Japanese Patent Laying-Open No. 55-030180 (Patent Document 1) discloses an electrode wherein an electrode base (porous electrode substrate) is prepared by metal-plating a porous body made of natural or synthetic fiber, and the electrode substrate is filled with an active material to produce the electrode. Further, Japanese Patent Laying-Open No. 61-208756 (Patent Document 2) discloses an electrode for an alkaline secondary battery, wherein a fiber mat having a metal-plated surface is prepared as an electrode base (porous electrode substrate), and the electrode substrate is filled with an active material and then pressed to obtain the electrode.

SUMMARY OF THE INVENTION

In recent years, however, there is a demand for a battery of smaller size and greater capacity, and less likely to suffer degradation of battery performance due to repeated charge and discharge. The electrodes described in Patent Documents 1 and 2 mentioned above cannot sufficiently satisfy such a demand.

For example, in the case of the electrode described in Patent Document 1, the porous electrode substrate needs to have a certain thickness so as to be filled with the active material of an adequate amount, making it impossible to satisfy the demand for downsizing. Further, when producing an electrode for high power application, the electrode is decreased in thickness to reduce the filling amount of the active material per unit area. When a thin electrode substrate is used in the first place to fill the active material therein, however, the total amount of the active material that can be filled in the electrode substrate is reduced, leading to the reduced capacity of the battery.

In the case of the electrode described in Patent Document 2, the thickness of the porous electrode substrate is reduced by compressing it after filling it with the active material of a predetermined amount. This can suppress reduction of the battery capacity as in the case of Patent Document 1. However, the battery produced using the electrode of Patent Document 2 suffered considerable degradation in battery capacity associated with charge and discharge.

The present invention has been made to solve the above-described problems. An object of the present invention is to provide a battery electrode having a desired thickness and desired capacity and capable of suppressing degradation of battery performance in association with charge and discharge, and a producing method thereof.

The inventors have found that an electrode produced by filling a porous electrode substrate with an active material and then compressing it suffers degradation of the performance of the battery, because its thickness returns to the level before compression due to the charge and discharge of the battery, and such deformation causes peeling of the active material from the porous electrode substrate. The inventors further found through various investigations that, even in the case of the electrode formed by compression, the degradation of the capacity associated with the charge and discharge can be restricted by regulating the ratio of compression of the electrode substrate, and have accomplished the present invention.

Specifically, the present invention provides a producing method of a battery electrode, including the steps of: filling an active material in an electrode substrate made of woven or non-woven fabric having its fiber surface coated with metal; and pressing the electrode substrate to obtain an electrode, wherein the step of pressing is carried out by using the electrode substrate having a thickness of less than 2.0 t when a thickness of the electrode after the pressing is t.

According to the producing method of a battery electrode of the present invention, it is possible to let the electrode substrate have a thickness allowing filling of an active material of a sufficient amount, and to produce a battery electrode unlikely to suffer peeling of the active material settled in the pores of the electrode. Accordingly, it is possible to produce a battery electrode having a high capacity density and suppressing degradation of a capacity retention rate due to repeated charge and discharge.

Further, the present invention provides a battery electrode produced by the producing method of the present invention described above.

By using the battery electrode of the present invention, it is possible to realize a high-performance electrode having a high capacity density and unlikely to suffer degradation of the capacity retention rate despite the repeated charge and discharge.

The battery electrode of the present invention preferably satisfies either (A) or (B) in the following:

(A) That a positive electrode capacity density is 400 mAh/cc to 550 mAh/cc, that a thickness is 0.4 mm to 0.55 mm, and that the active material filled in the electrode substrate is a positive electrode active material for a nickel-hydrogen battery; or (B) That a positive electrode capacity density is 550 mAh/cc to 750 mAh/cc, that a thickness is 0.55 mm to 0.75 mm, and that the active material filled in the electrode substrate is a positive electrode active material for a nickel-hydrogen battery.

The battery electrode and its producing method of the present invention described above are suitably applicable to fabrication of an electrode that has a high capacity density and is unlikely to suffer degradation of battery performance associated with repeated charge and discharge.

The foregoing and other objects, features, aspects and advantages of the present invention will become more apparent from the following detailed description of the present invention.

DESCRIPTION OF THE PREFERRED EMBODIMENTS

An electrode substrate for use in the producing method of a battery electrode according to the present invention is one that is formed by coating a fiber surface of woven or non-woven fabric with metal. In the producing method of a battery electrode of the present invention, the electrode substrate is filled with an active material and dried, and then subjected to pressing using a suitable known method of pressing, rolling or the like, to compress the electrode substrate in its thickness direction, to thereby produce the battery electrode.

The woven or non-woven fabric used in the producing method of a battery electrode of the present invention constitutes a core material of the electrode substrate. It generally has a very large proportion of pores with respect to the entire volume. The porosity of the electrode substrate is preferably not less than 85%, and more preferably from 90% to 97%, from the standpoint of increasing the filling amount of the active material. It is noted that the porosity described above represents the proportion of the pores with respect to the entire volume of the electrode substrate, which corresponds to the value calculated, e.g., by: {(volume of material used for electrode substrate) /(apparent volume of the electrode substrate)}×100.

The material of the woven or non-woven fabric used in the producing method of a battery electrode of the present invention is not particularly restricted. It may be synthetic fiber of polyethylene, polypropylene, polyamide or the like, or may be carbon fiber or the like. Among others, woven or non-woven fabric formed using polyolefin fiber is preferable from the standpoint of corrosion resistance.

The metal used to coat the woven or non-woven fabric is not particularly restricted. It may be, e.g., nickel, silver, cobalt, cadmium or the like. Among others, nickel or its alloy is preferable from the standpoint of cost, safety, and handiness. Herein, "coating" refers to the state that the metal covers the surface of the fiber and thus substantially no surface of the fiber is exposed (this includes the case where a part of the surface of the fiber is exposed). The way of coating the woven or non-woven fabric with metal may be selected from among conventionally known methods as appropriate in accordance with the metal being used. For example, plating (electroless plating or electrolytic plating), vapor deposition (sputtering or the like), or any combination thereof may be used.

In the producing method of a battery electrode of the present invention, it is preferable that the woven or non-woven fabric is coated with metal such that the surface density is in a range of 50 $g/m^2$ to 350 $g/m^2$ (more preferably, in a range of 150 $g/m^2$ to 250 $g/m^2$). If the surface density is less than 50 $g/m^2$, the exposed part of the fiber surface is too much, which will lead to an increased electric resistance of the electrode substrate. If the surface density exceeds 350 $g/m^2$, the porosity of the electrode substrate decreases, leading to a lowered capacity when used as an electrode. Herein, the surface density refers to a value obtained from the weight measured after eliminating the inner fiber by burning it out, for example.

Although the thickness of the metal coating the woven or non-woven fabric is not particularly restricted, it is preferably in a range of 2 μm to 10 μm, and more preferably in a range of 3 μm to 6 μm. If the thickness of the metal is less than 2 μm, the metal layer may be broken during the fabricating process of the electrode, which will lead to an increased electric resistance. If the thickness of the metal exceeds 10 μm, the porosity of the electrode substrate would likely decrease. As such, the metal coating the woven or non-woven fabric is very thin compared to the thickness of the woven or non-woven fabric. Therefore, the electrode substrate obtained by coating the woven or non-woven fabric with metal can be made to have the thickness and the porosity approximately equal to those of the woven or non-woven fabric before being coated with the metal.

The active material to be filled in the electrode substrate is not particularly restricted. It may be selected from among the conventionally known active materials appropriately in accordance with the battery to which the produced electrode is applied. For example, in the case of producing an electrode to be applied to a nickel-hydrogen battery, a positive electrode active material for nickel-hydrogen battery, such as nickel hydroxide or the like, can suitably be used as the active material.

The way of filling the active material in the electrode substrate is not particularly restricted. By way of example, a pasty mixed-agent having an active material as a base agent may be prepared, and the electrode substrate may be impregnated with this mixed agent. The pasty mixed agent used in this method may be a viscous liquid that contains, besides the active material as the base agent, a conductive auxiliary agent (for example, metallic powder or metallic short fiber of nickel or the like), a binder (for example, carboxymethylcellulose or the like), and other appropriate additives selected from conventionally known additives, in a content that would not impair the effects of the present invention.

The producing method of a battery electrode of the present invention is characterized in that, as the electrode substrate filled with the active material described above, the electrode substrate having a thickness of less than 2.0 t, when the thickness of the electrode after pressing is t, is subjected to the pressing. In other words, the producing method of a battery electrode of the present invention is characterized in that the electrode substrate filled with the active material is compressed to a thickness of more than 1/2.0 to produce the electrode. If the thickness of the electrode substrate is maintained in a resultant electrode (i.e., when the electrode is fabricated without pressing the electrode substrate), the electrode substrate to be filled with the active material is thin, and thus, the amount of the active material that can be filled in the electrode substrate is insufficient. If a battery is fabricated using such an electrode, the capacity of the resultant battery will be small. Further, good adhesion of the active material that would be ensured by the pressing process cannot be achieved, which means that the active material would likely peel off. Furthermore, if the thickness of the electrode substrate is equal to or more than 2.0 t with respect to the thickness t of the electrode after pressing, in a battery using the resultant electrode, the electrode will largely expand in associated with charge and discharge. In such a case, the active material would likely peel off, leading to a poor capacity retention rate of the battery.

In the producing method of a battery electrode of the present invention, the electrode is fabricated by pressing the electrode substrate having a thickness of less than 2.0 t when the thickness of the electrode after the pressing is t. This ensures that the electrode substrate has a thickness that allows the active material of an adequate amount to be filled therein, and the battery electrode in which the active material settled in the pores of the electrode would unlikely peel off can be fabricated. Accordingly, it is possible to produce a battery electrode that has a high capacity density even though the battery is thin, and that is unlikely to suffer degradation of capacity retention rate in spite of repeated charge and discharge.

Here, from the standpoint of filling the active material of an adequate amount in the electrode substrate, the thickness of the electrode substrate is preferably not less than 1.2 t when the thickness of the electrode after pressing is represented as t. More preferably, the electrode is fabricated by pressing the electrode substrate having a thickness in a range of 1.4 t to 1.85 t when the thickness of the electrode after the pressing is t.

The present invention also provides a battery electrode produced by the producing method of a battery electrode of the present invention described above. By using the battery electrode of the present invention, it is possible to realize a high-performance battery of which capacity density is high even with a thin electrode, and its capacity retention rate is unlikely to decrease despite the repeated charge and discharge.

For the battery electrode of the present invention, the electrode substrate filled with the active material and pressed may be used as an electrode as it is, or it may be folded to be used as an electrode. Further, the electrode substrate filled with the active material and pressed may be lined with a reinforcing member such as expanded metal, punching metal or the like, to be used as an electrode. It is noted that in the present invention, the "thickness of the electrode after pressing" refers to the thickness of the electrode substrate filled with the active material and pressed as described above; it does not refer to the thickness of the folded electrode substrate or the electrode substrate lined with the reinforcing member as described above.

While the battery electrode of the present invention is applicable to various batteries including nickel-hydrogen battery and lithium-sulfur battery (also lithium-ion battery with certain active materials) without any particular restriction, it can be applied particularly suitably to the nickel-hydrogen battery. For such a nickel-hydrogen battery, certain battery performance (representatively, capacity density and the like) may be required while the battery size is restricted depending on its application.

For example, in the case of a nickel-hydrogen battery for high power application, which is used in a hybrid vehicle, power tool or the like, it is required that the capacity of the positive electrode per volume (positive electrode capacity density) of the battery in the assembled state is in a range of 400 to 550 mAh/cc, and it is preferable that the thickness of the electrode at this time is in a range of 0.4 to 0.55 mm. Further, in the case of a nickel-hydrogen battery for high capacity application, which is used in a digital camera or the like, it is required that the positive electrode capacity density of the battery in the assembled state is in a range of 550 to 750 mAh/cc, and it is preferable that the thickness of the electrode at this time is in a range of 0.55 to 0.75 mm.

In view of the foregoing, the battery electrode of the present invention is preferably implemented with either (A) or (B) i n the following:

(A) That a positive electrode capacity density is 400 mAh/cc to 550 mAh/cc, that a thickness is 0.4 mm to 0.55 mm, and that the active material filled in the electrode substrate is a positive electrode active material for a nickel-hydrogen battery; or (B) That a positive electrode capacity density is 550 mAh/cc to 750 mAh/cc, that a thickness is 0.55 mm to 0.75 mm, and that the active material filled in the electrode substrate is a positive electrode active material for a nickel-hydrogen battery.

In this manner, it is possible to suitably implement an electrode for a nickel-hydrogen battery that satisfies the requirements according to the application.

It is noted that the capacity of the positive electrode of the nickel-hydrogen battery can be calculated, e.g., by multiplying the weight of the filled active material by a theoretical capacity of 289 mAh/g. The positive electrode capacity density refers to a value obtained by dividing the relevant capacity by the volume of the electrode.

The battery electrode and its producing method of the present invention described above are suitably applicable to fabrication of an electrode that has a high capacity density and is unlikely to suffer degradation of battery performance associated with repeated charge and discharge.

Hereinafter, the present invention will be described in more detail with reference to an experimental example, although the present invention is not restricted thereto.

EXPERIMENTAL EXAMPLE 1

In the present experimental example, a plurality of battery electrodes were fabricated by using electrode substrates of different thicknesses, and by differentiating the ratio of pressing (compression) of the electrode substrates.

Firstly, as core materials, non-woven fabrics of polyolefin resin were prepared in four thicknesses of 0.5 mm (porosity: 82.5%), 0.7 mm (porosity: 87.4%), 1.0 mm (porosity: 91.2%), and 1.3 mm (porosity: 93.3%). On a fiber surface of each non-woven fabric, a nickel thin film was formed by sputtering, to have a surface density of 10 g/m². Subsequently, the non-woven fabric having the nickel thin film formed thereon was further coated with a nickel thin film of 200 g/m² by electrolytic plating, to produce a porous electrode substrate. In the electrode substrate thus obtained, the nickel thin film coating the fiber surface of each non-woven fabric was very thin with an approximately uniform thickness of 3 μm. This means that the thickness and the porosity of the electrode substrate were approximately equal to those of the non-woven fabric before being coated with the metal.

Next, nickel hydroxide as the positive electrode active material for nickel-hydrogen battery was filled in the electrode substrate. The filling was carried out in the following manner. A pasty mixed agent containing nickel hydroxide as a base agent, and also containing additives including a conductive auxiliary agent (nickel powder) and a binder (carboxymethylcellulose) as the components other than nickel hydroxide, was prepared, and the electrode substrate was immersed in this mixed agent. The positive electrode active material was filled in the electrode substrate to have the capacity density of 400-550 mAh/cc for high power application, and have the capacity density of 550-750 mAh/cc for high capacity application.

After drying the electrode substrates each filled with the positive electrode active material at 80° C. for more than 0.5 hours, a pressing machine was used to press the electrode substrates at different compression ratios, to form band-shaped electrodes (positive electrodes for nickel-hydrogen battery) having a length of 180 mm and a width of 34 mm.

Table 1 shows the thickness of each electrode substrate, the thickness of an electrode obtained by pressing the electrode substrate, and a compression ratio (after pressing/before pressing).

TABLE 1

| Sample No. | Before pressing | After pressing | Compression ratio | Capacity | Positive electrode capacity density |
|---|---|---|---|---|---|
| 1 | 0.5 mm | 0.45 mm | 1/1.11 | 1000 mAh | 390 mAh/cc |
| 2 | 0.7 mm | 0.45 mm | 1/1.56 | 1400 mAh | 550 mAh/cc |
| 3 | 1.0 mm | 0.45 mm | 1/2.22 | 1400 mAh | 550 mAh/cc |
| 4 | 1.3 mm | 0.45 mm | 1/2.89 | 1400 mAh | 450 mAh/cc |
| 5 | 0.7 mm | 0.55 mm | 1/1.27 | 1700 mAh | 550 mAh/cc |
| 6 | 1.0 mm | 0.55 mm | 1/1.81 | 1700 mAh | 550 mAh/cc |
| 7 | 1.3 mm | 0.55 mm | 1/2.36 | 1700 mAh | 550 mAh/cc |
| 8 | 0.7 mm | 0.70 mm | 1/1.00 | 2000 mAh | 500 mAh/cc |
| 9 | 1.0 mm | 0.70 mm | 1/1.43 | 2800 mAh | 700 mAh/cc |
| 10 | 1.3 mm | 0.70 mm | 1/1.86 | 2800 mAh | 700 mAh/cc |

A nickel-hydrogen battery of a sealed cylindrical type was produced by using, as a negative electrode, an $AB_5$ metal hydride electrode formed in a band shape to match the size of the positive electrode fabricated in the above-described manner. The battery was produced by arranging the positive and negative electrodes wound in scroll form within a cylindrical vessel and by impregnating them with electrolyte. At this time, a separator made of polypropylene also formed in a band shape and subjected to processing to make it hydrophilic was arranged between the positive electrode and the negative electrode. As the electrolyte, a potassium hydroxide solution of 30 mass %, dissolved with lithium hydroxide of 30 g/L, was used. Table 1 also shows the results of measurement of the capacity and the positive electrode capacity density of each nickel-hydrogen battery thus produced.

The batteries of Sample Nos. 1-10 thus produced were repeatedly charged and discharged with the charge-and-discharge coefficient of 1C, to examine the capacity retention rate of the battery after 1000 cycles. The battery was disassembled after measurement of the capacity retention rate, and it was examined how much the thickness of the electrode was increased. The results are shown in Table 2. As seen from Table 2, by repeating the charge and discharge, the electrode returned almost to its thickness before compression. It is noted that the thickness of the electrode substrate in Table 2 shows the thickness before pressing.

TABLE 2

| Sample No. | Thickness of electrode substrate | Thickness after 1000 cycles | Capacity retention rate after 1000 cycles |
|---|---|---|---|
| 1 | 0.5 mm | 0.47 mm | 91% |
| 2 | 0.7 mm | 0.68 mm | 87% |
| 3 | 1.0 mm | 0.79 mm | 80% |
| 4 | 1.3 mm | 1.08 mm | 71% |
| 5 | 0.7 mm | 0.65 mm | 85% |
| 6 | 1.0 mm | 0.88 mm | 88% |
| 7 | 1.3 mm | 0.99 mm | 69% |
| 8 | 0.7 mm | 0.71 mm | 65% |
| 9 | 1.0 mm | 0.91 mm | 75% |
| 10 | 1.3 mm | 1.05 mm | 72% |

The performance of the battery of each sample was examined.

Firstly, as seen from Table 1, Sample No. 1 having the electrode substrate of 0.5 mm in thickness (and the electrode of 0.45 mm in thickness) had small capacity and small capacity density, and thus, it was a battery unsuitable for both high power application and high capacity application. The reason why the capacity and the capacity density of the battery of Sample No. 1 were small is presumably because, when filling the active material paste in the electrode substrate, the electrode substrate was so thin that it was not possible to fill in the active material of an adequate amount.

Further, it is evident from Table 1 and Table 2 that the electrodes of Sample Nos. 3, 4 and 7 would each suffer degradation of the capacity retention rate when assembled into a battery. More specifically, although the electrodes of Samples Nos. 3 and 4 each had the battery capacity and the positive electrode capacity density sufficient for the electrode for use in high power application, their capacity retention rates were lower by about 10% than those of the other electrodes (Sample Nos. 2 and 6) having the capacity and the positive electrode capacity density suitable for use in high power application. Meanwhile, although the electrode of Sample No. 7 had the battery capacity and the positive electrode capacity density sufficiently high for the battery electrode for use in high capacity application, its capacity retention rate was lower than those of the other electrodes (Sample Nos. 9 and 10) having the capacity and the positive electrode capacity density suitable for use in high capacity application. The reason why the capacity retention rates of the electrodes of Sample Nos. 3, 4 and 7 were lowered is presumably because the electrode substrate was compressed too much during formation of the electrode, resulting in an increased amount of expansion of the electrode in association with charge and discharge, and consequently, the active material peeled off from the collector (electrode substrate), or a large amount of electrolyte was absorbed in the electrode, causing the separator to become dry.

Further, as to Sample No. 8 wherein the electrode substrate filled with the active material is used as an electrode without pressing, retentivity of the active material is small, which presumably caused considerable degradation of the capacity retention rate.

In contrast, each of the electrodes of Sample Nos. 2, 5, 6, 9 and 10, formed by pressing the electrode substrate filled with the active material to a thickness within a prescribed range, has a large capacity when assembled into a battery, and an excellent capacity retention rate after 1000 cycles.

From the above-described results, it has become apparent that the battery electrode of the present invention, when assembled into a battery, can suppress degradation of the battery performance in association with charge and discharge, while securing a required capacity density.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A producing method of a battery electrode, comprising the steps of:
    filling an active material in an electrode substrate made of woven or non-woven fabric having its fiber surface coated with metal such that the surface density is in a range of 50 g/m$^2$ to 350 g/m$^2$, wherein the porosity of the electrode substrate is not less than 85%; and
    pressing the electrode substrate to obtain an electrode, wherein
    said step of pressing is carried out by using the electrode substrate having a thickness in a range of 1.4t to 1.85t when a thickness of the electrode after the pressing is t, and
    the way of coating the woven or non-woven fabric with metal is electrolytic plating after sputtering.

* * * * *